United States Patent [19]

Kögler et al.

[11] 4,246,518
[45] Jan. 20, 1981

[54] BRUSHLESS DIRECT CURRENT MOTOR

[75] Inventors: Georg Kögler, Schwabach; Karl Schalk, Nuremberg, both of Fed. Rep. of Germany

[73] Assignee: Siemens Aktiengesellschaft, Munich, Fed. Rep. of Germany

[21] Appl. No.: 946,104

[22] Filed: Sep. 27, 1978

[30] Foreign Application Priority Data

Sep. 27, 1977 [DE] Fed. Rep. of Germany ....... 2743411

[51] Int. Cl.³ .............................................. H02P 1/23
[52] U.S. Cl. .................................... 318/138; 318/254; 318/439
[58] Field of Search ............... 318/138, 254, 685, 696, 318/439

[56] References Cited

U.S. PATENT DOCUMENTS 3,360,709 12/1967 Etter .................................. 318/310
4,093,905 6/1978 Von Braun .......................... 318/696

*Primary Examiner*—J. V. Truhe
*Assistant Examiner*—John W. Redman
*Attorney, Agent, or Firm*—Kenyon & Kenyon

[57] ABSTRACT

A brushless dc motor, a method for commutating the motor, and a commutation circuit for the motor are disclosed. The commutation signals which are to be supplied to the motor commutator are stored until released by a control signal. Thereupon, the stored commutation signal is supplied to the commutator and maintained until generation of the next control signal. In the meantime, the next commutation signal is stored awaiting the generation of the next control signal whereupon the next commutation signal will be transferred to the commutator. The brushless dc motor may be operated in a stepping mode and circuit means and a method are disclosed for generating the stepping signal and for operating the motor in the stepping mode.

7 Claims, 3 Drawing Figures

BRUSHLESS DIRECT CURRENT MOTOR

BACKGROUND OF THE INVENTION

The invention relates to a brushless dc motor and more particularly to a method for commutating a brushless dc motor and to a commutation circuit for the commutation of a brushless dc motor.

One drawback of prior art dc motors is that they cannot be operated directly in a stepping mode of operation.

SUMMARY OF THE INVENTION

It is an object of the present invention to provide a brushless dc motor and a method for commutating the motor upon actuation or command or address.

It is another object of the present invention to provide an actuatable commutation circuit for a brushless dc motor.

It is also an object of the present invention to provide a brushless dc motor and an actuatable commutation circuit therefor in which each commutation signal is supplied to the commutator upon an actuation by a control signal.

It is a further object of the present invention to provide such a brushless dc motor, a method for commutating the motor and a commutation circuit for the motor so that the motor may be used as a stepping motor.

These and other objects are achieved in a simple manner by providing according to the invention a method for commutating the motor and a commutation circuit for the motor in which the commutation signals to be supplied to the motor commutator are stored until released by a control (or clock or address) signal. Thereupon, the stored commutation signal is supplied to the commutator and maintained until generation of the next control signal. In the meantime, the next commutation signal is stored awaiting the generation of the next control signal whereupon the next commutation signal will be transferred to the commutator. The brushless dc motor may be operated in a stepping mode in which case a stepping signal is generated as the control signal.

Further in accordance with the invention, a commutation circuit is provided in which an intermediate storage element is disposed between a selection circuit and the motor commutator. The selection circuit supplies commutation signals to the storage element which stores each signal until a control signal is fed to the storage element, at which time the storage element transfers the commutation signal to the commutator. The storage element maintains each commutation signal that is fed to the commutator until the generation of the next control signal while storing the next commutation signal. Thus, the output of the storage element is fed to the commutator upon every control signal and maintained until the next control signal is generated, while the next commutation signal is supplied to the storage element and stored there until the next control signal arrives.

In accordance with one aspect of the invention, the control signal is a stepping pulse and the motor is operated in a stepping mode. The stepping pulse signal is provided to actuate the storage element so that the motor may be operated as a stepping motor. The stepping pulse signal is also used to determine the number of angular steps to be carried out and is derived from each change of the signal ultimately fed to the commutator.

The method according to the invention for commutating a brushless dc motor comprises the steps of generating a commutation signal representative of the position of the rotor of the motor, temporarily storing the commutation signal, generating a control signal, and transferring the stored commutation signal to the motor commutator upon generation of the control signal, the commutation signal transferred to the commutator being maintained until a next control signal is generated and while the next commutation signal is being stored. The method further includes the step of generating a stepping pulse control signal in response to the commutation signal and a signal corresponding to the desired state of energization of the motor windings to operate the motor in the stepping mode.

In accordance with the disclosed embodiment, the commutation circuit comprises selection circuit means for receiving a signal corresponding to the position of the rotor of the dc motor and generating commutation signals in response thereto, actuatable storage circuit means having a control input, data inputs coupled to the outputs of the selection circuit means and data outputs coupled to the motor commutator. The storage circuit means receives each commutation signal from the selection circuit means and transfers it to the outputs of the storage circuit means upon actuation (or clocking) of the storage circuit means at the control (or clock) input by a control (or clock) signal. The storage circuit means maintains the transferred commutation signal at its outputs until actuated by a next control signal while storing the next commutation signal. In the stepping mode of operation, counter circuit means are provided which are coupled to the outputs of the selection circuit means. The counter circuit means receives the commutation signals from the selection circuit means and other signals corresponding to the desired state of energization of the motor windings. In response to these signals, the counter means provides to the control input control signals in the form of a stepping pulse signal to operate the motor in a stepping mode.

The commutation circuit includes an OR gate and a AND gate. The OR gate has its inputs coupled to the outputs of the selection circuit means and its output coupled to an input of the counting circuit means with the output of the OR gate also being coupled to one input of the AND gate. An output of the counting circuit means is coupled to another input of the AND gate and the output of the AND gate is coupled to the control input of the storage circuit means. Another OR gate is disposed between the output of the AND gate and the control input of the storage circuit means, with the output of this OR gate being coupled to the control input, one input of this OR gate being coupled to the output of the AND gate and the other input of this OR gate being coupled to a start signal.

These and other aspects of the invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

Figure 1:
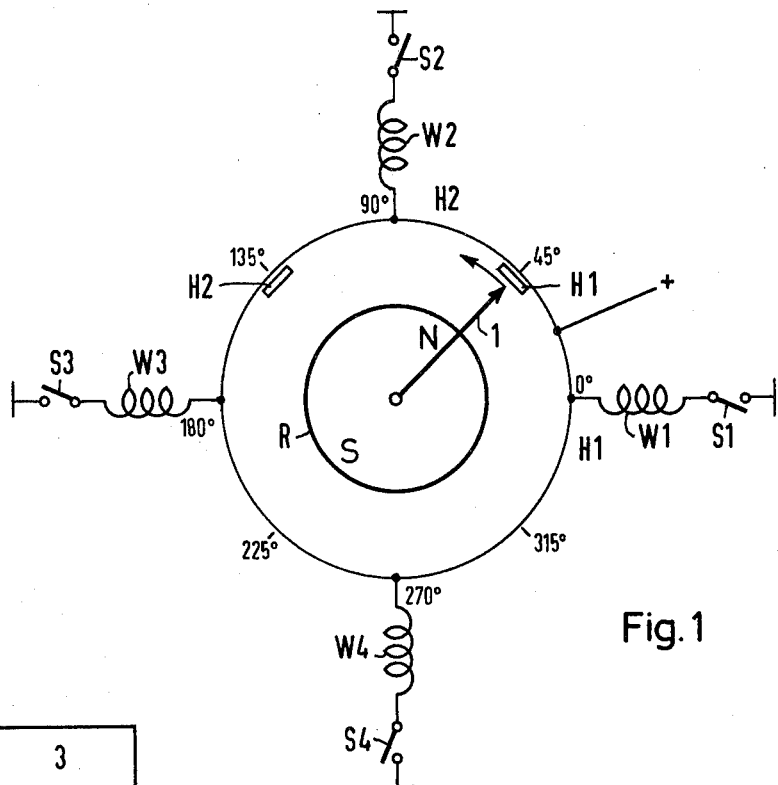
FIG. 1 is a schematic diagram of a brushless dc motor.

DESCRIPTION OF THE PREFERRED EMBODIMENT a brushless dc motor as shown in FIG. 1 has four phase windings or legs W1, W2, W3, and W4. One end of each of the windings is connected to a neutral point which, in the embodiment shown, is connected to the positive pole of a voltage source. The other ends of the phase windings are connected to the negative pole of the voltage source via switches S1 and S4. The switches S1 to S4 are preferably solid-state switching elements which are known to those in the art. R designates a rotor, e.g. a permanent magnet rotor, whose north-south orientation is indicated by the arrow 1. H1 and H2 designate two rotor position transmitters, e.g. Hall effect transmitters which, in the embodiment shown, are excited by the north and south orientations of the rotor R.

The commutation is such that the rotor R rotates in a counterclockwise direction and the commutation angles are 45°, 135°, 225°, 315°. For example, the winding W3 is energized when the rotor R moves within the angular range from 45° to 135°, with the winding W4 being energized next when the rotor R moves within the angular range from 135° to 225°. Thereafter, winding W1 is energized when the rotor R moves within the angular range from 225° to 315°. Winding W2 is energized next as the rotor R moves within the angular range of 315° to 45°. the commutation signals thus lead the respective rotor position by 135° so that a forced rotation of the rotor R takes place. A dc motor of this type is described in greater detail in the Journal IndustriElektrik & Elektronik, Vol. 19, 1974, No. 19, pages 405 to 410.

As stated above, the winding W2 is energized when the rotor R moves within the angular range from 315° to 45°. This momentary status of the commutation signals will cause the rotor to position itself in the direction of the energized winding W2. However, at this time, a new commutation signal is generated which would energize winding W3. To prevent this, an intermediate storage element is provided according to the invention which stores the commutation signal to be supplied to the winding W3 until released by a control signal.

Figure 2:
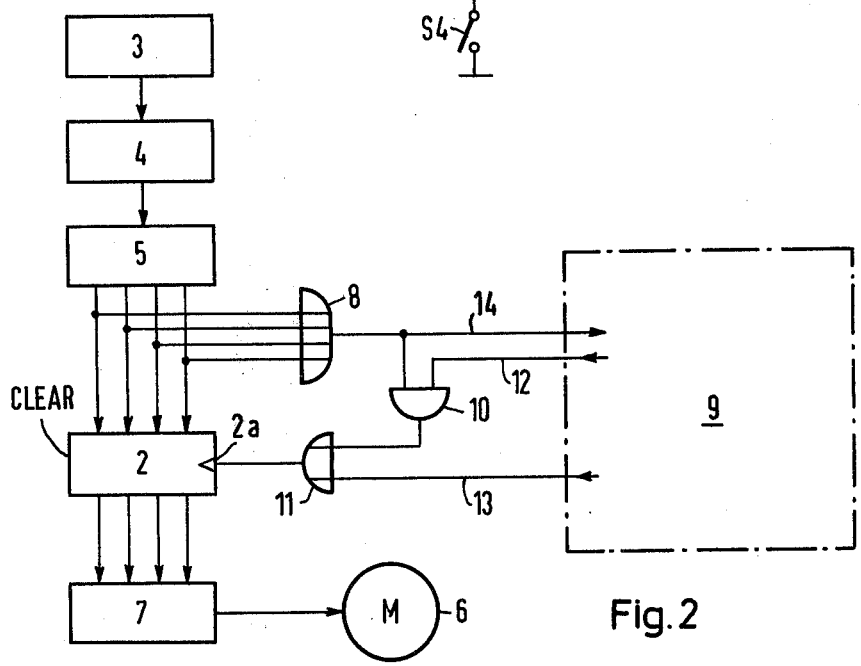
FIG. 2 is a block and schematic circuit diagram of a commutation circuit according to the invention for the motor of FIG. 1.

Referring to FIG. 2, a commutation circuit is shown in which a rotor position transmitter 3 essentially consists of the two Hall effect generators H1 and H2 which are influenced directly by the rotor R to provide rotor position signals. Amplifier 4 appropriately amplifies the position signals of the two Hall effect generators H1 and H2 and the amplified position signals from amplifier 4 are fed to a selection circuit 5 which provides a signal for the activation of the switches S1 to S4 as a function of the rotor position, thereby providing commutation signals for the motor. The outputs of the selection circuit 5 are connected to the inputs of the intermediate storage element 2. The signal at the inputs of the intermediate storage element is transferred to the outputs of the storage element 2 by a control (or clock or address) signal fed to the control (or clock) input 2a of the storage element. The outputs of the storage element 2 are connected to the commutator 7. By this arrangement, the commutation signals from the selection circuit 5 are fed to the storage element 2 and upon the receipt of a control signal, the storage element transfers that commutation signal to the commutator, with the storage element maintaining that commutation signal at its outputs until the receipt of the next control signal. In the meantime, the commutation signal fed to the storage element changes. However, the next commutation signal is not transferred to the storage element outputs until the receipt by the storage element of the next control signal. Therefore, if the winding W2 is energized by a signal from the selection circuit 5 via the storage element 2, the rotor 6 will position itself in the direction of winding W2, this condition is being maintained until the storage element receives the next control signal. In the meantime, the selection circuit 5 has generated a new commutation signal in accordance with the rotor position which would energize winding W3. However, this commutation signal is not fed to the commutator until the storage element 2 receives the next control signal. A continuous rotor motion can be achieved by repeatedly clocking the storage element. A clock 16 (FIG. 3) having the desired frequency may be connected to one input of OR gate 11 through a switch S5 to operate the motor in this mode.

According to another aspect of the invention, the motor is operated in a stepping mode, i.e. a stepping motion is obtained for the rotor. In this mode, the motor may be used for positioning. A stepping pulse is generated for each change of the commutation signals to switches S1 to S4 and is fed to an external preselection counter 9 via an OR gate 8 on line 14. The stepping pulse is also fed directly to the control input of the storage element. In order to be able to use the motor for positioning, the external preselection counter 9 determines the number of the angular steps to be carried out. The stepping pulses are transmitted to the control input of the storage element 2 via an AND gate 10 and an OR gate 11. The preselection counter 9 provides a signal to the AND gate 10 via line 12 as long as a predetermined rotor position has not yet been reached. Therefore, as long as a predetermined number of steps has not been reached, each pulse of the stepping pulse signal actuates briefly the storage element 2. This causes a commutation sequence to appear at the output of the storage element 2 and, hence, at the commutator 7. With each pulse of the stepping pulse signal, the rotor turns by one angular step.

A starting pulse can be transmitted to the input of the storage element 2 via line 13 and the OR gate 11 to clear or preset the circuit elements and to preposition the rotor.

Details of the position transmitter 3, amplifier 4, selection circuit 5, storage device 2 (a latch for example) and commutator 7 are known to those in the art and accordingly are not described herein.

Figure 3:
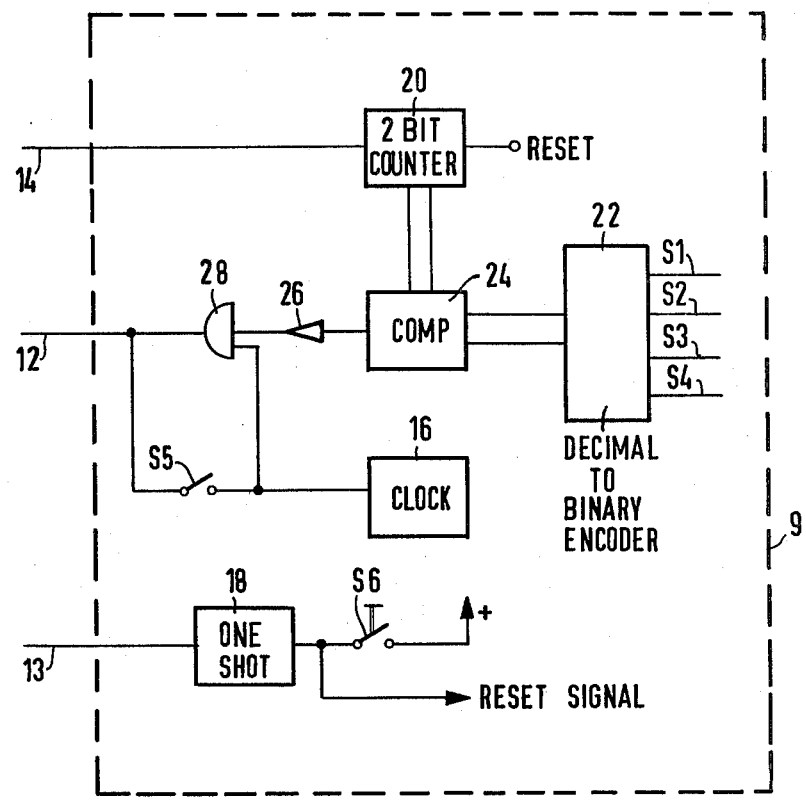
FIG. 3 is a schematic circuit diagram of a counter circuit used in the commutation circuit of FIG. 2 for stepping operation of the brushless dc motor of FIG. 1.

A circuit diagram for a preselection counter is shown in FIG. 3 within the broken-line box designating the preselection counter 9 in FIG. 2. In the embodiment of the motor shown in FIG. 1, the Hall effect generators H1, H2 generate signals representing four positions of the rotor and selective, individual energization of the windings W1–W4 position the rotor in any of four positions. Therefore, two bits are sufficient to represent the four positions. The preselection counter 9 may comprise, for example, a two bit binary counter 20 which receives the commutation signal from OR gate 8 on line 14 as a counting input and provides a binary coded output. An encoder 26 is fed signals representative of the desired state of energization of switches S1-S4 (and represent the desired position of the rotor) and provides a two bit binary coded output. The binary count of counter 20 and the binary output of encoder 22 are compared in a digital comparator 24, i.e. the outputs of the counter are connected to one set of compare inputs of the comparator and the outputs of the encoder are connected to another set of compare inputs of the comparator. The comparator 24 compares the counter and encoder outputs and generates a pulse at the comparator output when they are equal. The output of the comparator is connected to the input of an inverter 26. The output of the inverter 26 is connected to one input of AND gate 28 and a clock 16 is connected to the other input of AND gate 28. The inverted output of the comparator enables AND gate 28 whenever the output of the comparator is not pulsed, i.e. when the counter and encoder outputs are unequal. This permits the clock signal to pass through AND gate 28 to line 12. In the stepping mode of operation, switch S5 is open as shown in FIG. 3 and in the continuous mode of operation switch S5 is closed to couple the clock 16 to OR gate 11 as described above. A start signal is generated on line 13 by closing switch S6 to connect a positive source of voltage to the one shot multivibrator 18. a predetermined period of time after closing switch S6, the start signal is generated on line 13. Closing switch S6 also generates a reset signal which is coupled to the reset of counter 20 and the clear input of storage circuit 2. The reset signal resets both counter outputs to logic "0" and clears the outputs of the storage circuit 2.

In the stepping mode of operation, a desired switch energization signal is fed to encoder 22 for moving the rotor to a desired position. The count at the output of counter 20 represents the actual rotor position. If the rotor is not in the desired position, the counter and encoder outputs are unequal and AND gate 28 is enabled. The clock signal is thus coupled to the clock input 2a of the storage element via line 12, AND gate 10 and OR gate 11. With each clock pulse fed to the clock input of the storage element, a commutation signal representing the next counter-clockwise position of the rotor is transferred to the commutator. Each such clock signal rotates the rotor in 90° steps until the rotor is in the desired position, when the counter and encoder outputs will be equal and AND gate 28 will be disabled. The frequency of the clock is selected to advance the rotor at a desired rate.

To start up the motor, switch S6 is depressed. This resets counter 20 and clears the storage element 2. Clearing the storage element, e.g. setting the outputs to logic "0", will move the rotor to a predetermined starting position. One shot 18 delays the start signal to the clock input of the storage element until after the rotor has reached its predetermined position. At this time, the first commutation signal is transferred to the commutator in the continuous mode of operation, and in the stepping mode of operation, the rotor will be rotated towards the first selected position.

The stepping control of electronically commutated dc motors such as the one shown in FIG. 2 is independent of the design and type of the motor; additionally, stepping control is independent of the number of phase windings to be commutated or the type of the rotor position transmitters, in accordance with the present invention.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. A commutation circuit for a brushless dc motor comprising selection circuit means for receiving a signal corresponding to the position of the rotor of the dc motor and generating a commutation signal in response thereto, actuatable storage circuit means having a control input, an input coupled to the output of the selection circuit means and an output adapted to being coupled to the motor commutator, means for providing a control circuit including counter means coupled to the output of the selection circuit means, the counter circuit means receiving the commutation signal from the selection circuit means and a signal corresponding to the desired state of energization of the motor windings and in response thereto providing the control signal to the control input of the storage circuit means, the control signal being a stepping pulse signal adapted to operate the motor in a stepping mode, the storage circuit means receiving the commutation signal from the selection circuit means and transferring the received commutation signal to the output of the storage circuit means upon actuation of the storage circuit means by the control signal applied to the control input, the storage circuit means maintaining the transferred commutation signal at its output until actuated by a next control signal.

2. The commutation circuit as recited in claim 1 and including an OR gate and a AND gate, the OR gate having its inputs coupled to the output of the selection circuit means and its output coupled to an input of the counting circuit means, the output of the OR gate also being coupled to one input of the AND gate, an output of the counting circuit means being coupled to another input of the AND gate and the output of the AND gate being coupled to the control input of the storage circuit means.

3. The commutation circuit as recited in claim 2 and comprising another OR gate coupled between the output of the AND gate and the control input of the storage circuit means, the output of the other OR gate being coupled to the control input, one input of the other OR gate being coupled to the output of the AND gate and the other input of the other OR gate being adapted to being coupled to a start signal.

4. A brushless dc motor and a commutation circuit therefor comprising selection circuit means for receiving a signal corresponding to the position of the rotor of the dc motor and generating a commutation signal in response thereto, actuatable storage circuit means having a control input, an input connected to the output of the selection circuit means and an output connected to the motor commutator, means for providing a control signal including counter circuit means coupled to the output of the selection circuit means and means for generating another signal corresponding to the desired state of energization of the motor windings, the counter circuit means receiving the commutation signal from the selection circuit means and said other signal and in response thereto providing the control signal to the control input of the storage circuit means, the control signal being a stepping pulse signal whereby the motor is operated in a stepping mode, the storage circuit means receiving the commutation signal from the selecion circuit means and transferring the commutation signal to the output of the storage circuit means upon actuation of the storage circuit means by the control signal applied to the control input, the storage circuit means maintaining the transferred commutation signal at its output until actuated by a next control signal.

5. The motor as recited in claim 4 and including an OR gate and a AND gate, the OR gate having its inputs coupled to the output of the selection circuit means and its output coupled to the counting means, the output of the OR gate also being coupled to one input of an AND gate, the output of the counting means being coupled to another input of the AND gate and the output of the AND gate being coupled to the control input of the storage circuit means.

6. The motor as recited in claim 5 and comprising another OR gate coupled between the output of the AND gate and the address input of the storage circuit means, the output of the other OR gate being coupled to the address input, one input of the other OR gate being coupled to the output of the AND gate and the other input of the other OR gate being adapted to being coupled to a start signal.

7. A method for commutating a brushless dc motor comprising the steps of:
    providing a rotor position signal corresonding to the position of the rotor of the dc motor;
    generating a commutation signal in response to the rotor position signal;
    storing the commutation signal;
    providing a desired energization state signal corresponding to the desired state of energization of the motor windings;
    generating a control signal which is a stepping pulse signal adapted to operate the motor in a stepping mode in response to the commutation signal and the desired energization state signal; and
    transferring the stored commutation signal to the motor upon generation of the control signal.

* * * * *